United States Patent
DeYoung et al.

(10) Patent No.: US 9,546,250 B2
(45) Date of Patent: *Jan. 17, 2017

(54) PROCESS FOR PREPARING DYNAMICALLY VULCANIZED ALLOYS

(71) Applicant: ExxonMobil Chemical Patents Inc., Baytown, TX (US)

(72) Inventors: Ronald DeYoung, Westfield Center, OH (US); Maria D. Ellul, Silver Lake Village, OH (US); Dennis Kumor, Copley, OH (US); Ronald Keith Waters, Pace, FL (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/647,252

(22) PCT Filed: Oct. 15, 2013

(86) PCT No.: PCT/US2013/065001
§ 371 (c)(1),
(2) Date: May 26, 2015

(87) PCT Pub. No.: WO2014/099117
PCT Pub. Date: Jun. 26, 2014

(65) Prior Publication Data
US 2015/0307665 A1 Oct. 29, 2015

Related U.S. Application Data

(60) Provisional application No. 61/740,114, filed on Dec. 20, 2012.

(51) Int. Cl.
| | | |
|---|---|---|
| B29C 47/00 | (2006.01) |
| C08L 77/00 | (2006.01) |
| C08J 3/00 | (2006.01) |
| C08J 5/18 | (2006.01) |
| C08L 23/22 | (2006.01) |
| C08L 77/02 | (2006.01) |
| C08L 77/06 | (2006.01) |
| B29C 47/10 | (2006.01) |
| B29C 47/40 | (2006.01) |
| C08J 3/20 | (2006.01) |
| B29K 23/00 | (2006.01) |
| B29K 77/00 | (2006.01) |
| B29K 105/00 | (2006.01) |

(52) U.S. Cl.
CPC ............ *C08J 3/005* (2013.01); *B29C 47/1081* (2013.01); *B29C 47/40* (2013.01); *C08J 3/203* (2013.01); *C08J 5/18* (2013.01); *C08L 23/22* (2013.01); *C08L 77/02* (2013.01); *C08L 77/06* (2013.01); *B29K 2023/22* (2013.01); *B29K 2077/00* (2013.01); *B29K 2105/0038* (2013.01); *B29K 2105/0044* (2013.01); *C08J 2321/00* (2013.01); *C08J 2323/22* (2013.01); *C08J 2347/00* (2013.01); *C08J 2377/02* (2013.01); *C08J 2423/26* (2013.01); *C08J 2437/00* (2013.01); *C08J 2477/02* (2013.01); *C08J 2477/06* (2013.01)

(58) Field of Classification Search
None
See application file for complete search history.

(56) References Cited

U.S. PATENT DOCUMENTS

| 4,454,092 A | 6/1984 | Shimizu et al. |
|---|---|---|
| 4,594,390 A | 6/1986 | Abdou-Sabet et al. |
| 5,234,993 A | 8/1993 | Huynh-Ba |
| 5,240,983 A | 8/1993 | Tabata et al. |
| 5,298,211 A | 3/1994 | Hamanaka et al. |
| 5,574,105 A | 11/1996 | Venkataswamy |
| 8,021,730 B2 | 9/2011 | Tsou et al. |
| 2006/0293458 A1 | 12/2006 | Chung et al. |
| 2011/0054093 A1 | 3/2011 | Ellul et al. |
| 2011/0073164 A1 | 3/2011 | Solis et al. |
| 2014/0228521 A1 | 8/2014 | Siegers et al. |

FOREIGN PATENT DOCUMENTS

| EP | 0 915 124 | 3/2006 |
|---|---|---|
| JP | 07-165931 | 6/1995 |
| JP | 08-197538 | 8/1996 |
| WO | 03/031150 | 4/2003 |
| WO | 2007/001600 | 1/2007 |
| WO | 2007/001601 | 1/2007 |
| WO | 2007/001609 | 1/2007 |
| WO | 2009/151859 | 12/2009 |

*Primary Examiner* — Ana Woodward
(74) *Attorney, Agent, or Firm* — Nancy T Krawczyk (57) ABSTRACT

This invention relates to the preparation of a dynamically vulcanized alloy comprising at least one elastomer and at least one thermoplastic resin. More specifically, the process produces dynamically vulcanized alloys with unique morphological features which have good impermeability and low temperature flexibility. In the process, the thermoplastic resin is added into the extruder in two stages with an intermediate addition of a compatibilizer. Also during the final addition of thermoplastic resin, the elastomeric curatives are added to the extruder.

19 Claims, 3 Drawing Sheets

PROCESS FOR PREPARING DYNAMICALLY VULCANIZED ALLOYS

CROSS-REFERENCE TO RELATED APPLICATION

This application is a National Phase application of PCT/US2013/065001, filed Oct. 15, 2013 which claims the benefit of U.S. Provisional Patent Application No. 61/740,114, filed Dec. 20, 2012, the disclosure of which is incorporated herein by reference in their entirety.

FIELD OF THE INVENTION

The present invention relates generally to processes for preparing dynamically vulcanized alloys of elastomer and thermoplastic resins.

BACKGROUND OF THE INVENTION

Various types of thermoplastic elastomer compositions containing elastomers, both cured and uncured, and thermoplastic resins, are known in the industry as either thermoplastic plastic vulcanizates (TPVs) or as dynamically vulcanized alloys (DVAs). The elastomer is dispersed in the thermoplastic resin, providing flexibility to the material due to the elastomer and reprocessability due to the thermoplastic resin. These materials are known to be useful in a variety of applications including automotive parts, such as bumpers, knobs, and trim, electrical and applications, such as cable jacketing and connectors, and industrial applications, such as piping, o-rings, sleeves, extruded spiral hoses, and weather stripping. For all of these known applications, the TPVs or DVAs are cast or molded to form the final products.

The conventional fabrication process is a multiple-step process having the following steps. The compound is produced by (i) preparing a rubber master batch by mixing, at temperatures below the cross-linking temperature, the elastomer and curative until a uniform mix state is obtained (this is often referred to as pre-conditioning) and (ii) premixing a resin master batch comprising a thermoplastic resin and plasticizers. If desired, fillers such as carbon, oil, calcium carbonate, nanofillers, etc., may also be added to the rubber master batch. A thermoplastic resin masterbatch is mixed typically in a twin screw extruder by mixing the resin and plasticizers. The resin masterbatch may then be pelletized. The rubber master batch, resin master batch, and all remaining components are then fed into a mixer, as well as any desired secondary components, and mixed under shear conditions. The elastomer component is vulcanized during the melt mixing.

Commercial TPVs are typically not compounded or prepared for use in low-permeability applications, and are generally polyolefin based compounds. The processes existing to produce the polyolefin based TPV are operated at high extruder screw speeds (>greater than 250 revolutions/minute) and corresponding high peak shear rates. The higher screw speeds allows for high net output. See U.S. Pat. No. 5,298,211 and U.S. Pat. No. 4,594,390. The processes utilize the high shear rates to reduce rubber particle size, simultaneously during the curing reaction in the extruder. The typical rubber particle size for such thermoplastic elastomers is above 1 micron size, often 3 to 10 microns. An energy efficient process for producing sub-micron size particles is different from the above noted patents due to the fact that the basic rubber particle structure is thought to be formed in part due to an interfacial reaction between the rubber and the thermoplastic prior to cure.

DVAs compounded for low permeability [or stated alternatively: high impermeability] applications comprise low-permeability thermoplastic resin, such as polyamide or a blend of polyamides, in which there is dispersed a low-permeability rubber. Such low permeability rubbers include butyl rubber, halobutyl rubbers, or brominated isobutylene para-methylstyrene copolymers. The rubber is cured under conditions of dynamic vulcanization (curing the rubber during melt mixing as opposed to static curing that typically occurs in a rubber mold) and is intimately and uniformly dispersed as a particulate phase within a continuous phase of the thermoplastic resin. For low permeability applications, it is desired to achieve a composition having sub-micron size dispersed rubber particles. This dispersed particle size assists the material in having elastic properties.

The elastic nature is desirable for applications requiring flexibility, strength, and elongation. Such properties are also desirable in tire materials. Thus, in recent years, the use of DVAs as tire inner liner layers has been explored. The thermoplastic resin provides a very low permeability to the inner liner layer while the elastomer provides flexibility and durability to the inner liner layer. As the thermoplastic resin provides a very low permeability, in comparison to an all elastomeric inner liner composition, the inner liner layer formed from DVA can be formed as a very thin layer. Conventional inner liner layers, comprised of only a base elastomer(s), typically have a thickness or gauge in the range of 1.25 to 7.0 mm while inner liner layers formed from DVA have typically a thickness range of 0.25 mm to 0.08 mm.

However, the past work of Applicants and others in using DVA for tire innerliners has highlighted the need for continued improvement in the process of preparing DVAs. As noted above, TPVs and DVAs have conventionally been molded or cast to form the end products. Films having a thickness in range of 0.25 mm to 0.08 mm are not molded or cast, but must be extruded or blown thru a suitable die. The morphology of the DVA material, which is impacted by the DVA manufacturing process, has a significant impact on the ability to obtain a quality extrusion and quality film. In particular, a DVA film's low temperature durability is dependent not only on the composition but also on the morphology of the final product.

SUMMARY OF THE INVENTION

The present invention is directed to a process for preparing a dynamically vulcanized alloy ("DVA") comprising a thermoplastic resin and an elastomer. Preferably the elastomer is a low-permeability rubber. In the process, the elastomer and the thermoplastic resin are fed into a mixer where the mixture is dynamically vulcanized. The thermoplastic resin can be added into the extruder in two stages with an intermediate addition of a compatibilizer or other components. Elastomeric curatives are added to the extruder in a manner that permits the decoupling of the rubber and resin grafting and the rubber vulcanization. Thus, some or all of the curative may be added at the initial feed throat if the curative has a delayed cure time, i.e. a long induction time; or the curative is added downstream from the initial feed throat introduction of the rubber into the extruder; this addition may occur in conjunction with a thermoplastic resin addition, in-between thermoplastic resin additions, or after all thermoplastic resin has been added. The process produces dynamically vulcanized alloys with unique morphological features which have good impermeability and low temperature flexibility.

Disclosed herein is a process for producing the DVA. The process comprises the following minimum consecutive steps of:

a. feeding the elastomer and a first portion of the thermoplastic resin into the feed throat of an extruder having an L/D ratio;
b. mixing the elastomer and the first portion of thermoplastic resin;
c. feeding compatibilizer into the extruder;
d. mixing the elastomer, first portion of thermoplastic resin, and compatibilizer to begin grafting of the elastomer and the thermoplastic resin without any curing or substantial curing of the elastomer;
e. feeding a second portion of the thermoplastic resin into the extruder; and
f. curing the rubber while mixing the contents of the extruder under shear conditions to achieve at least 80% cure of the elastomeric particles in the thermoplastic resin, thereby forming a dynamically vulcanized alloy.

In another aspect of the invention, the elastomer is added directly into the feed throat without any prior mixing with other components of the dynamically vulcanized alloy.

In another aspect of the invention, the curatives are pelletized with a portion of the thermoplastic resin prior to feeding the curative into the extruder.

In another aspect of the invention, the second portion of thermoplastic resin added in step e) is 10 to 75 wt % of the total thermoplastic resin in the alloy.

In any aspect of the disclosed invention, the elastomer is present in the alloy in an amount in the range of from about 2 to about 90 wt % of the total alloy blend. Also, the thermoplastic resin is present in the alloy in an amount in the range of from 10 to 98 wt % based on the total alloy blend.

Also disclosed herein are process conditions to achieve the desired morphology of the DVA wherein the majority of the discrete rubber particles have a submicron maximum diameter, as measured by small angle x-ray scattering, dispersed in a continuous thermoplastic resin matrix, and the desired physical characteristics of any film formed from the DVA. One process condition is the specific energy. In any embodiment of the disclosed invention, after the curatives have been fed into the extruder in step e), the extruder is operated at a specific energy in the range of not more than 0.39, or in the range of 0.35 to 0.29, or in the range of 0.33 to 0.30 measured in Kw-hr/kg.

Also disclosed herein is a film or sheet formed from the dynamically vulcanized alloy. The film has an ESR value in the range of 0.51 to 1.5 μmeters.

These and other features, aspects, and advantages of the present invention will become better understood with regard to the following description and appended claims.

DETAILED DESCRIPTION OF THE INVENTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer or the like is used as shorthand.

Elastomer refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent." In the present invention, elastomers may be referred to as polymers, elastomeric polymers, or rubbers; the term elastomer may be used herein interchangeably with the term rubber or polymer.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

The terms "vulcanized" or "cured" refers to the chemical reaction that forms bonds or cross-links between the polymer chains of an elastomer.

The term "dynamic vulcanization" is used herein to connote a vulcanization process in which a vulcanizable elastomer, present with a thermoplastic resin, is vulcanized under conditions of high shear. As a result of the shear mixing, the vulcanizable elastomer is simultaneously cross-linked and dispersed as fine particles of a "micro gel" within the thermoplastic resin, creating a dynamically vulcanized alloy ("DVA"). The unique characteristic of the DVA is that, notwithstanding the fact that the elastomer component may be fully cured, the DVA can be processed and reprocessed by conventional rubber processing techniques such as extrusion, injection molding, compression molding, etc. Scrap or flashing can be salvaged and reprocessed.

The terms "downstream" and "upstream" when discussing a process or an extruder are given conventional terms in the art. When referencing something as 'downstream' in the process or extruder, it means a point in time or location in the process or extruder that is after the referenced point. When referencing something as 'upstream' in the process or extruder, it means a point in time or location in the process or extruder that is before the referenced point. For example, if B is introduced downstream of A, then B is introduced into the process or extruder after A and conversely if B is introduced upstream of A, then it is introduced before A.

The DVA of the present invention, made by the inventive process, has a desired morphology wherein the elastomer is uniformly dispersed as fine particles within the thermoplastic resin. The thermoplastic resin component forms the continuous phase and the elastomer is the dispersed phase even where the rubber to resin ratio is 1.0 or more. The dispersed particle size of the elastomer and the structure of the resin phase are controlled to improve the durability of the DVA, in particular durability at low temperatures.

As discussed above, for conventional polyolefin TPV with a large micron size dispersed particle size, high screw speeds and shear rates are conventional. However, the thermoplastic resins used in low permeability applications require the use of lower screw speeds and relatively lower shear rates. The reason for the lower screw speed operation is the need for completing several reactions, in sequence along the screw axis to create the small rubber particle morphology and complete grafting/compatibilizing or curing reactions.

Applicants have determined that one of the key reactions for generating a desirable mostly sub-micron morphology is the interfacial reaction between the thermoplastic resin and rubber polymer chains. In the low permeability materials this interfacial reaction, also known as grafting between the thermoplastic resin and the elastomer, needs to occur before a significant amount reactive sites in the rubber are consumed by the rubber curing reaction. For purposes of this invention, a significant amount of reactive sites in the rubber would be equal or greater than 30%, or alternatively equal or greater than 40%; thus, significant cure has taken place when more this amount of the reactive sites in the rubber have been consumed by cross-linking to other reactive sites with the assistance of a curing agent. Additionally, to assist in differentiating between the two reactions that will occur during mixing in accordance with the present invention, for purposes of this invention interfacial reaction/grafting shall refer to bonding between elastomers and thermoplastic resins, and curing shall be limited to cross-linking of the elastomer itself accomplished by the assistance of a separate curing agent that is not a thermoplastic resin. Therefore, significant cure of rubber should take place after the substantial completion of the interfacial reaction/grafting, thereby creating the desired submicron elastomeric particles size in a continuous thermoplastic resin matrix, also referred to as the morphology of the DVA. The average elastomeric particle size for the majority of elastomeric particles in the DVA is defined by a diameter in the range of 100 to 1,000 nanometers (0.1 microns to 1.0 microns), or 125 to 500 nanometers in any embodiment of the invention, or 125 to 400 nanometers in any embodiment of the invention. Particle size can be determined by methods well known in the art and including tapping phase atomic force microscopy (AFM). A determination of substantial completion of the interfacial reaction can best be determined by the average elastomeric particle size; if the particle size is within 50%, or alternatively 70%, or alternatively 75% of the desired final average particle size.

Another key process step is to ensure effective and efficient mixing of the rubber and thermoplastic resin. For this, the viscosity of the thermoplastic phase needs to be close to that of the rubber. This is accomplished by providing a thermoplastic viscosity reducer to the blend at an appropriate point along the extruder, while maintaining an optimal concentration of thermoplastic to rubber. In the disclosed invention, this is accomplished by delaying addition of all the thermoplastic resin into the feed throat, providing at least a portion of the thermoplastic resin at a location downstream of the rubber feed stream; the later addition of thermoplastic resin may occur in more than one downstream location. Furthermore, a reactive plasticizer such as polyisobutylene succinic anhydride or polyisobutene succinic anhydride can also be used to attenuate the viscosity of the thermoplastic phase and may also be added at multiple locations along the extruder length.

The lower screw speed operation also allows longer residence time which is needed for completing melting and mixing to complete interfacial reactions and allow cure completion. Another reason for a relatively lower screw speed is to prevent the blend temperature from rising above the rubber degradation temperature. The interfacial reactions occurring in the extruder increase the effective molecular weight and viscosity of the mixture in the extruder; if the mixture were processed under a higher screw speed the temperature of this increasingly more viscous mixture would rise above the rubber degradation temperature. A consequence of this lower screw speed operation is that the extruder capacity is limited by available torque or power. This is a significant advantage to development of a new process where the consumption of specific energy (KW-hr/kg) can be reduced.

Elastomers

The elastomeric component of the DVA may be selected from an assortment of thermosetting, elastomeric materials. For uses where impermeability of the final article to be produced is desired, the use of at least one low-permeability elastomer is desired.

Useful for this invention are elastomers derived from a mixture of monomers, the mixture having at least the following monomers: a $C_4$ to $C_7$ isoolefin monomer and a polymerizable monomer. In such mixtures, the isoolefin is present in a range from 70 to 99.5 wt % of the total monomers in any embodiment, or 85 to 99.5 wt % in any embodiment. The polymerizable monomer is present in amounts in the range of from 30 to about 0.5 wt % in any embodiment, or from 15 to 0.5 wt % in any embodiment, or from 8 to 0.5 wt % in any embodiment. The elastomer will contain monomer derived unit amounts having the same weight percentages.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The polymerizable monomer may be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene, alkylstyrene e.g. p-methylstyrene, and dichlorostyrene are also suitable for preparing a useful elastomer.

Preferred elastomers useful in the practice of this invention include isobutylene-based copolymers. An isobutylene based elastomer or a polymer refers to an elastomer or a polymer comprising at least 70 mol % repeat units from isobutylene and at least one other polymerizable unit. The isobutylene-based copolymer may or may not be halogenated.

In any embodiment of the invention, the elastomer may be a butyl-type rubber or branched butyl-type rubber, especially halogenated versions of these elastomers. Useful elastomers are unsaturated butyl rubbers such copolymers of olefins or isoolefins and multiolefins. Non-limiting examples of unsaturated elastomers useful in the method and composition of the present invention are poly(isobutylene-co-isoprene), polyisoprene, polybutadiene, polyisobutylene, poly (styrene-co-butadiene), natural rubber, star-branched butyl rubber, and mixtures thereof. Useful elastomers in the present invention can be made by any suitable means known in the art, and the invention is not herein limited by the method of producing the elastomer. Butyl rubber is obtained by reacting isobutylene with 0.5 to 8 wt % isoprene, or reacting isobutylene with 0.5 wt % to 5.0 wt % isoprene—the remaining weight percent of the polymer being derived from isobutylene; the butyl rubber contains monomer derived unit amounts having the same weight percentages.

Elastomeric compositions of the present invention may also comprise at least one random copolymer comprising a $C_4$ to $C_7$ isoolefin and an alkylstyrene comonomer. The isoolefin may be selected from any of the above listed $C_4$ to $C_7$ isoolefin monomers, and is preferably an isomonoolefin, and in any embodiment may be isobutylene. The alkylstyrene may be para-methylstyrene, containing at least 80%, more alternatively at least 90% by weight of the para-isomer. The random copolymer may optionally include functionalized interpolymers. The functionalized interpolymers have at least one or more of the alkyl substituents groups present in the styrene monomer units; the substituent group may be a benzylic halogen or some other functional group. In any embodiment, the polymer may be a random elastomeric copolymer of a $C_4$ to $C_7$ α-olefin and an alkylstyrene comonomer. The alkylstyrene comonomer may be para-methylstyrene containing at least 80%, alternatively at least 90% by weight, of the para-isomer. The random comonomer may optionally include functionalized interpolymers wherein at least one or more of the alkyl substituents groups present in the styrene monomer units contain a halogen or some other functional group; up to 60 mol % of the para-substituted styrene present in the random polymer structure may be the functionalized. Alternatively, in any embodiment, from 0.1 to 5 mol % or 0.2 to 3 mol % of the para-substituted styrene present may be the functionalized.

The functional group may be halogen or some other functional group which may be incorporated by nucleophilic substitution of any benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. In any embodiment, the elastomer comprises random polymers of isobutylene and 0.5 to 20 mol % para-methylstyrene wherein up to 60 mol % of the methyl substituent groups present on the benzyl ring is functionalized with a halogen such a bromine or chlorine, an acid, or an ester.

In any embodiment, the functionality on the elastomer is selected such that it can react or form polar bonds with functional groups present in the thermoplastic resin, for example, acid, amino or hydroxyl functional groups, when the DVA components are mixed at reactive temperatures.

Brominated poly(isobutylene-co-p-methylstyrene) "BIMSM" polymers useful in the present invention generally contain from 0.1 to 5 mol % of bromomethylstyrene groups relative to the total amount of monomer derived units in the copolymer. In any embodiment of the invention using BIMSM, the amount of bromomethyl groups is from 0.5 to 3.0 mol %, or from 0.3 to 2.8 mol %, or from 0.4 to 2.5 mol %, or from 0.5 to 2.0 mol %, wherein a desirable range for the present invention may be any combination of any upper limit with any lower limit. Also in accordance with the invention, the BIMSM polymer has either 1.0 to 2.0 mol % bromomethyl groups, or 1.0 to 1.5 mol % of bromomethyl groups. Expressed another way, exemplary BIMSM polymers useful in the present invention contain from 0.2 to 10 wt % of bromine, based on the weight of the polymer, or from 0.4 to 6 wt % bromine, or from 0.6 to 5.6 wt %. Useful BIMSM polymers may be substantially free of ring halogen or halogen in the polymer backbone chain. In any embodiment, the random polymer is a polymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.5 to 2.0 mol % based on the total number of para-methylstyrene, and wherein the para-methylstyrene derived units are present from 5 to 15 wt %, or 7 to 12 wt %, based on the total weight of the polymer. In any embodiment, the para-(halomethylstyrene) is para-(bromomethylstyrene).

Other suitable low-permeability elastomers are isobutylene containing elastomers such isobutylene—isoprene—alkylstyrene terpolymers or halogenated isobutylene-isoprene-alkylstyrene terpolymers wherein for each of these terpolymers, the isobutylene derived component in the terpolymer is 70 to 99 wt % of the monomer units in the polymer, the isoprene derived component is 29 to 0.5 wt % of the monomer units in the polymer, and the alkylstyrene derived component is 29 to 0.5 wt % of the monomer units in the polymer.

Suitable $C_4$ to $C_7$ isoolefin derived elastomers (including the brominated isobutylene-paramethylstyrene copolymers) having a number average molecular weight Mn of at least about 25,000, preferably at least about 50,000, preferably at least about 75,000, preferably at least about 100,000, preferably at least about 150,000. The polymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 30 or more, or more preferably 40 or more.

Preferred elastomers include copolymers of isobutylene and para-alkylstyrene, which may or may not be halogenated. Preferably the copolymer of isobutylene and para-alkylstyrene is halogenated. Such elastomers are described in European Patent Application 0 344 021. The copolymers preferably have a substantially homogeneous compositional distribution. Preferred alkyl groups for the para-alkylstyrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene. Preferred brominated copolymers of isobutylene and para-methylstyrene include those having 5 to 12 weight % para-methylstyrene, 0.3 to 1.8 mol % brominated para-methylstyrene, and a Mooney viscosity of 30 to 65 (1+4) at 125° C. (as measured by ASTM D 1646-99).

Thermoplastic Resin

For purposes of the present invention, a thermoplastic (alternatively referred to as thermoplastic resin) is a thermoplastic polymer, copolymer, or mixture thereof having a Young's modulus of more than 200 MPa at 23° C. The resin should have a melting temperature of about 160° C. to about 260° C., preferably less than 260° C., and most preferably less than about 240° C. In a preferred embodiment, the thermoplastic resin should have a molecular weight in the range of 13,000 to 50,000. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with an aromatic functional groups such as halogen or acidic groups. Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH) and mixtures thereof.

Suitable polyamides (nylons) comprise crystalline or resinous, high molecular weight solid polymers including homopolymers, copolymers, and terpolymers having recurring amide units within the polymer chain. Polyamides may be prepared by polymerization of one or more epsilon lactams such as caprolactam, pyrrolidinone, lauryllactam and aminoundecanoic lactam, or amino acid, or by condensation of dibasic acids and diamines Both fiber-forming and molding grade nylons are suitable. Examples of polyamides include polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), poly(hexamethylene dodecanediamide (nylon-6,12), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 160 and 260° C. being preferred.

Suitable polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexanedimethylene) oxlate and poly-(cis-1,4-cyclohexanedimethylene) succinate, poly ($C_{2-4}$ alkylene terephthalates) such as polyethyleneterephthalate and polytetramethylene-terephthalate, poly ($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) resins which may be used in accordance with this invention are well known, commercially available materials produced by the oxidative coupling polymerization of alkyl substituted phenols. They are generally linear, amorphous polymers having a glass transition temperature in the range of 190° C. to 235° C.

Ethylene copolymer resins useful in the invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used herein means, generally, copolymers of ethylene with unsaturated esters of lower ($C_1$-$C_4$) monocarboxylic acids and the acids themselves; e.g., acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

In the dynamically vulcanized alloy, the thermoplastic resin is present in an amount ranging from about 10 to 98 wt % based on the alloy blend, and from about 20 to 95 wt % in another embodiment. In yet another embodiment, the thermoplastic resin is present in an amount ranging from 35 to 90 wt %. The amount of elastomer in the DVA is in an amount ranging from about 2 to 90 wt % based on the alloy blend, and from about 5 to 80 wt % in another embodiment. In any embodiment of the invention, the elastomer is present in an amount ranging from 10 to 65 wt %. In the invention, the thermoplastic resin is present in the alloy, relative to the amount of elastomer, in an amount in the range of 40 to 80 phr.

Secondary Elastomer

In some embodiments, the DVA may further comprise a secondary elastomer. The secondary elastomer may be any elastomer, but preferably the secondary elastomer is not an isobutylene-containing elastomer. An example of a preferred secondary elastomer is a maleic anhydride-modified copolymer. Preferably, the secondary elastomer is a copolymer comprising maleic anhydride and ester functionalities such as maleic anhydride-modified ethylene-ethyl acrylate.

The secondary elastomer may be added to the DVA processing extruder simultaneously with the initial elastomer and the thermoplastic resin initial feedstreams. Alternatively, it may be added to the extruder downstream from the elastomer and initial thermoplastic resin feedstreams.

The amount of the secondary elastomer in the DVA may be in the range of from about 2 wt % to about 45 wt %. If the DVA comprises at least one elastomer and a secondary elastomer, the total amount of both the elastomer and secondary elastomer is preferably in the range of from about 2 wt % to about 90 wt %.

This secondary elastomer may be cured along with the primary isoolefin based elastomer or it may be selected to remain uncured and act as a compatibilizer as discussed below.

Other DVA Components

Other materials may be blended into the DVA to assist with preparation of the DVA or to provide desired physical properties to the DVA. Such additional materials include, but are not limited to, curatives, stabilizers, compatibilizers, reactive plasticizers, non-reactive plasticizers, extenders and polyamide oligomers or low molecular weight polyamide and other lubricants as described in U.S. Pat. No. 8,021,730 B2.

Curing of the primary elastomer is generally accomplished by the incorporation of the curing agents and optionally accelerators, with the overall mixture of any such components referred to as the cure system or cure package. Suitable curing components include sulfur, metal oxides, organometallic compounds, radical initiators. Common curatives include ZnO, CaO, MgO, Al2O3, CrO3, FeO, Fe2O3, and NiO. These metal oxides can be used alone or in conjunction with metal stearate complexes (e.g., the stearate salts of Zn, Ca, Mg, and Al), or with stearic acid or other organic acids and either a sulfur compound or an alkyl or aryl peroxide compound or diazo free radical initiators. If peroxides are used, peroxide co-agent commonly used in the art may be employed. The use of peroxide curative may be avoided if the thermoplastic resin is one such that the presence of peroxide would cause the thermoplastic resin to cross-link.

As noted, accelerants (also known as accelerators) may be added with the curative to form a cure package. Suitable curative accelerators include amines, guanidines, thioureas, thiazoles, thiurams, sulfenamides, sulfenimides, thiocarbamates, xanthates, and the like. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR90), N-tertiarybutyl-2-benzothiazole sulfenamide (TBBS), N-(1,3-dimethylbutyl)-N'-phenyl-p-phenylenediamine (6PPD), and N-oxydiethylene thiocarbamyl-N-oxydiethylene sulfonamide (OTOS), zinc 2-ethyl hexanoate (ZEH), N,N'-diethyl thiourea.

In any embodiment of the invention, at least one curing agent is typically present at about 0.1 to about 15 phr; alternatively at about 1.0 to about 10 phr, or at about 1.0 to 6.0 phr, or at about 1.0 to 4.0 phr, or at about 1.0 to 3.0 phr, or at about 1.0 to 2.5 phr, or at about 2.0 to 5.0 phr. If only a single curing agent is used, it is preferably a metal oxide such as zinc oxide.

Minimizing the viscosity differential between the elastomer and the thermoplastic resin components during mixing and/or processing enhances uniform mixing and fine blend morphology that significantly enhance good blend mechanical as well as desired permeability properties. However, as a consequence of the flow activation and shear thinning characteristic inherent in elastomeric polymers, reduced viscosity values of the elastomeric polymers at the elevated temperatures and shear rates encountered during mixing are much more pronounced than the reductions in viscosity of the thermoplastic component with which the elastomer is blended. It is desired to reduce this viscosity difference between the materials to achieve a DVA with acceptable elastomeric dispersion sizes.

Components previously used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines One common group of compatibilizers are maleic anhydride-grafted ethylene-ethyl acrylate copolymers (a solid rubbery material available from Mitsui-DuPont as AR-201 having a melt flow rate of 7 g/10 min measured per JIS K6710), as well as butylbenzylsulfonamide and polyisobutylene succinic anhydride; the use of such additives are further discussed in pending U.S. application Ser. No. 12/548,797, filed Aug. 29, 2009. These compounds may act to increase the 'effective' amount of thermoplastic material in the elastomeric/thermoplastic compound. The amount of additive is selected to achieve the desired viscosity comparison without negatively affecting the characteristics of the DVA. If too much additive is present, impermeability may be decreased and the excess may have to be removed during post-processing. If not enough compatibilizer is present, the elastomer may not invert phases to become the dispersed phase in the thermoplastic resin matrix.

Both reactive and non-reactive plasticizers can function as compatibilizers due to the nature of a plasticizer. Plasticizers for thermoplastics are generally defined as a compound added to polymeric materials to improve flexibility, extensibility, and processability. Known and conventional thermoplastic plasticizers are supplied in the form of low to high viscosity liquid and may be functionalized. Many different plasticizers are known in the thermoplastic resin art as plasticizers have different compatibilities with each type of thermoplastic resin and have different effects on the properties of the thermoplastic resin. Known thermoplastic plasticizers include different types of esters, hydrocarbons (aliphatic, naphthenic, and aromatic), polyesters, and polycondensates; see *Handbook of Thermoplastic Elastomers*, Jiri George Drobny, p. 23 (William Andrew Publishing, 2007). For polyamides, known non-reactive plasticizers include hydrocarbons functionalized by tertiary amines, secondary diamines, or sulfonamides. One particularly well known compound is butylbenzylsulfonamide (BBSA).

Both maleic and succinic anhydrides functionalized oligomers are also useful as reactive plasticizers. The anhydride functionalized oligomer (AFO) may be prepared by thermal or chloro methods known in the art of reacting an alkyl, aryl, or olefin oligomer with anhydride, preferably maleic anhydride. The oligomer of any embodiment of the invention, including copolymers of lower olefins, being reacted with the anhydride, has a molecular weight in the range of about 500 to 5000, or 500 to 2500, or 750 to 2500, or 500 to 1500. The oligomer of the invention may also have a molecular weight in the ranges of 1000 to 5000, 800 to 2500, or 750 to 1250. Specific examples of succinic anhydrides include polyisobutylene succinic anhydride, polybutene succinic anhydride, n-octenyl succinic anhydride, n-hexenyl succinic anhydride, and dodocenyl succinic anhydride. The most preferred anhydride functionalized oligomers for this invention are those derived from polyisobutene and are commonly known as polyisobutylene succinic anhydride or polyisobutene succinic anhydride (PIBSA). The PIBSA may be made by cationic polymerization of isobutene with boron trifluoride as catalyst. In the course of the polymerization, high concentations of α-olefins are formed during the transfer reaction and as a result the polymerization product has a high proportion of terminal double bonds (α-olefin). They are normally clear to amber viscous liquids and are specially optimized during the post polymerization maleation reaction to have a low bismaleiation.

The anhydride level of the AFO of the invention may vary and a preferred range is about 1% to about 30 wt % with a preferred range of 5 to 25 wt % and a more preferred range of 7 to 17 wt % and a most preferred range of 9 to 15 wt %.

DVA Mixing

Previously, a variety of mixers and combinations of mixers have been considered suitable for preparing DVAs. However, the morphology of the DVA is dependent upon the mixing conditions, including temperature, order of introducing ingredients, residence time, as well as shear rates. For thin films, of the type to be used for preparing tire inner liners, the morphology of the DVA is critical in obtaining the desired properties. Uniform distribution of submicron or nanometer sized elastomer particles in a continuous polyamide matrix is important to achieve optimum properties. In particular, for these DVA end-use applications, the timing of the addition of the curing components and the temperature profile of the various components during mixing are critical to ensure the correct morphology is developed. Sub-inclusions of the thermoplastic inside the rubber particles may also be present; but for any sub-inclusions in the elastomer, the thermoplastic resin will preferably not be discontinuous in the DVA. Thus, prior methods of DVA preparation are being found insufficient to meet more stringent morphology and property demands for the DVA.

As discussed already, to obtain the desired morphology, Applicants have determined that several key reactions must occur in proper order and key process factors must be considered during mixing.

An embodiment of the invention will now be more particularly described with reference to FIG. 1. A twin screw extruder 10 is the preferred melt processing device (those in the art will appreciate that the drawing is merely schematic of a twin screw extruder and is not limited for any actual extruder; i.e., open or closed feed points). The extruder 10 preferably has at least two intermeshing and co-rotating screws 12 located along the length of the extruder 10. At one end of the extruder 10 is a feed throat 14 into which flows at least two feedstreams: a primary thermoplastic resin feedstream 16 and an elastomer feedstream 18. Neither the resin nor the elastomer in these feedstreams 16, 18 have been preblended (beyond that which was necessary to obtain the elastomeric copolymer or thermoplastic polymer or copolymer) or prepared as a masterbatch prior to entry into the extruder 10. The elastomer has been chopped into granulate form and coated with minimal amounts of a partitioning agent, such as talc, to enable the elastomer to be free flowing as it enters the extruder 10 but it has not been blended with any curatives, fillers, or other compounding additives. At the initial feed throat 14, optional additional feedstreams may be introduced into the extruder 10 in any combination with the thermoplastic and elastomer feedstreams 16, 18: a plasticizer or compatibilizer feedstream 20, a secondary thermoplastic resin and/or elastomer feedstream 22, and a stabilizer feedstream 24. The stabilizer fed into the extruder 10 via the feedstream 24 may be a pelletized form of the desired stabilizer in the DVA composition that has been preblended into a small amount of the primary thermoplastic resin. Alternatively, all of these feed streams may be blended just before being feed into the extruder via the initial feed throat 14.

The amount of the primary thermoplastic resin added to the extruder 10 via feedstream 16 is preferably less than the total amount of primary thermoplastic resin intended to be present in the final DVA composition. As noted above, by delaying the addition of all the thermoplastic resin into the mixture, an optimal concentration of thermoplastic to rubber is obtained while initial interfacial grafting between the thermoplastic and the rubber occurs. This also slows down an undesirable significant increase in the viscosity of the mixture as it flows thru the first portion of the extruder 10. In fact, it could be inferred that the reduction in thermoplastic viscosity that aids the mixing of the thermoplastic and elastomer also promotes the interfacial reaction between these components.

The temperature in the first half of the extruder 10 reaches a temperature of 5° C. to 45° C. above the melt temperature of the thermoplastic resin. For the majority of the above listed thermoplastic resins, including the preferred polyamide resins, this is a temperature range of 230° C. to 270° C. During mixing of the elastomer and the thermoplastic resin in the first half of the extruder 10, due to interfacial reaction of the thermoplastic resin and elastomer, the molecular weight and viscosity of the mixture begins to increase. To control this viscosity increase of the mixture, downstream of the initial feedthroat 14, compatibilizer or viscosity modifier may be introduced via at least one new feedstream 26. Applicants also theorize that the delay in addition of all of the thermoplastic resin results in an optimal concentration of thermoplastic to plasticizer to reduce the thermoplastic viscosity to that of, or just below, the elastomer to promote mixing to achieve the desired morphology. When the feedstream 26 is introduced as a liquid feedstream, metering pumps are used to ensure the correct pressure and amount of liquid is added to the extruder 10. For a liquid stream, the compatibilizer is added at an injection pressure between 0 to 700 psi. This addition of compatibilizer is added before curatives are added, so that the viscosity of the mixture during progress of the interfacial reaction is controlled. In one embodiment, all of the compatibilizer or plasticizer is added in the initial feed throat 14, thereby initially maximizing the 'effective' amount of the thermoplastic resin and decreasing the resin viscosity; this makes it possible to achieve an improved phase inversion of the elastomer and resin during mixing of the DVA.

The feedstream 26 is introduced at a point anywhere from 15% of the extruder length to 38% of the extruder length to diameter ratio (L/D). The L/D ratio is in the range of 30 to 80, or 36 to 72, or alternatively 40 to 60. The length L typically refers to the flighted length of the screw; in other words, the length of the screw portion that contains flights. If flights are present on the screw in a portion which does not encounter the components of the composition, such portion is not included in the determination of the screw length L. The diameter D of the screw refers to the maximum width of the bore in the extruder barrel, into which the flighted screw fits; in other words where screw flights are present, since extruder screws typically have sections of varying width depending on the function of a particular portion of the screw. If flights are present on the screw in a portion which does not encounter the components of the composition, such a portion is not included in the determination of screw length of extruder. Once established for a given system/composition, the L/D ratio is typically a maintained constant even if the extruder size is changed. In any embodiment of the invention the feedstream 26 may be located anywhere from 15% to 35% of the extruder L/D. The addition point of feed stream 26 is after the initial feedthroat 14 but before the addition of any curative/vulcanization components. If the introduction is too soon, sufficient time for initiation of the interfacial reaction might not be provided. However, if the compatibilizer feedstream is after 38% of the extruder length, the mixture may be too viscous to obtain good dispersal of the later added curatives or successful phase inversion of the rubber and thermoplastic resin.

After sufficient mixing of the elastomer and the thermoplastic resin to obtain grafting of the rubber and thermoplastic resin, the second desired reaction, vulcanization of the rubber, is initiated via an already added long induction time curative or curatives added into the extruder 10. The curatives may be added as a powder, a liquid, or a solid. In any embodiment of the invention, all of the curatives to be used may be preblended in a single form, such as a solid pellet. Alternatively, all or some of the curatives may be preblended with a pre-determined measure of thermoplastic resin to form a curative pre-blend. In such embodiments, the amount of thermoplastic resin used to form the curative pre-blend will be not more than 15 wt % of the total amount of thermoplastic resin used in the final DVA composition; preferably not more than 10 wt %, more preferably not more than 8 wt %. Thus, at least some of the curatives are pre-blended with 0 to 15 wt % of the total amount of thermoplastic resin, or from 0 to 10 wt % or 0 to 8 wt % of the total amount of thermoplastic resin. The thermoplastic resin used to preblend with the curatives may be the primary or a secondary thermoplastic resin; for example, if the DVA composition uses both a primary nylon copolymer and a secondary nylon homopolymer, the curative preblend may incorporate either the copolymer or the homopolymer. The curatives are added via a feedstream 28 at feedthroat 30 of the extruder. The feedthroat 30, and thus the introduction of the curative feedstream 28, may be at any point from 30% to 60% of the extruder length L/D. Alternatively, in any embodiment of the invention, the feedstream 28 may be introduced into the extruder at any point from 33% to 45% of the extruder length L/D.

Additionally, at feedthroat 30, additional thermoplastic resin feedstream 32 enters the extruder 10. The two feedstreams 28, 32 may be blended together using an additional mixer prior to entering the feedthroat 30 or as discussed above; or the streams 28, 32 may be added at any point within the permissible feedthroat 30 location along the extruder length as discussed above. The total amount of additional thermoplastic resin, whether added via feedstream 32 and/or preblended with the curatives, is in the range of 10 to 75 wt %, alternatively 25 to 70 wt %, alternatively 30 to 65 wt %, alternatively 30 to 55 wt %, or alternatively not less than 10 wt % of the total amount of thermoplastic resin used in the final DVA composition. In any embodiment of the invention, this secondary addition of thermoplastic resin should be not more than 75 wt % of the total amount of thermoplastic resins in the DVA. After this downstream addition of this portion of thermoplastic resin, all of the thermoplastic resin required for the DVA composition has been introduced into the extruder. The downstream addition, or second portion addition, of thermoplastic resin may be the primary thermoplastic resin or a secondary thermoplastic resin in the DVA composition. This downstream addition is accomplished via a non-melt or melt feed apparatus.

After the introduction of the curatives 28 and the secondary addition of primary thermoplastic, the temperature in the extruder 10 is reduced by 5° C. to 50° C. to achieve a temperature in the range of 225° C. to 260° C. This reduction in extruder temperature is to enable curing of the dispersed particles of elastomer in the mixture; however, the maximum temperature is determined to prevent scorching of the elastomer. The temperature in the extruder 10 at this point enables curing of the elastomer in a controlled manner so that the elastomer achieves the desired cure profile. Several cure profiles are shown in FIG. 2. These cure profiles are obtainable in the extruder 10, wherein the step-growth cure profile [shown by the solid symbols] is a preferred cure profile. With the step-growth cure profile, the DVA exits the extruder 10 substantially fully cured and is less subject to reversion of the cure during subsequent use of the DVA in film forming and article forming applications.

After curing of the elastomer has begun, at a location downstream of the feedthroat 30 additional constituents 34 of the DVA may be introduced into the extruder 10. Such additional constituents may include, but are not limited to, thermal and/or UV stabilizers and additional viscosity modifiers such as the already discussed AFOs. At such a downstream location, due to the curing—and polymer chain movement restriction due to the curing—the addition of a viscosity modifier at a downstream location is helpful to continue to move the DVA through the extruder. Viscosity modifiers and stabilizers may include 6PPD, steric acid, and low molecular weight nylon blends. Addition could be one or more of these additives at 0% to 5%, preferably at 0.5% to 3%, more preferably at 0.5% to 2%. The feed of such additional constituents 34 can be provided in neat format as a solid or a liquid or as a concentrate in solid or liquid form. A liquid form may be preferred if the additives have a lower melt point than the melt temperature in the mixer at the addition point to prevent blockage in the feeder or extruder due to any undesired isolated melting of the additives.

Any volatiles or gasses generated during mixing may be removed using a vacuum vent at one or more locations (not illustrated) along the extruder 10; such vacuum vents or gas ports are well known in the extruder art. Excess zinc oxide present will also act as an acid scavenger and neutralize any hydrogen halide gas.

After the DVA has been mixed to form the alloy, in any embodiment of the invention, the DVA exits the extruder 10 and passes through a melt gear pump in preparation for sending the DVA through downstream operations such as a pelletizing extruder.

One of the control conditions for the extrusion mixing is specific energy, which is equivalent to the overall energy supplied to the extruder per the mass passing through the extruder. The amount of overall energy supplied to the material may be affected by the melt temperature in the extruder, the amount of energy required to rotate the extruder blocks in the extruder, the amount of mass moving through the extruder, and the speed of the mass moving through the extruder. For example, if a small volume of mass having a low viscosity and a low melt temperature is moved through an extruder, not much energy is required to move the material through the extruder. Stated conversely, depending on the material selection, lower screw speeds require lower energy to rotate the screws, and a lower temperature is generated in the melt. Due to this relationship, the RPM of the screw may be proportional to the melt temperature; thus, for higher viscosity mixes with higher melt temperatures a greater amount of energy is required for a given screw design. Conventional conditions for dynamic mixing of the elastomer and the thermoplastic resin components generally require a specific energy greater than 0.35 kw-hr/kg or higher. However, Applicants have determined that such a high specific energy may be detrimental to the desired morphology of the DVA comprising a non-ethylene based elastomer. The present invention enables a reduction in the specific energy; the specific energy for any embodiment is not more than 0.37 kw-hr/kg, or alternatively in the range of 0.28 to 0.35 kw-hr/kg, or alternatively in the range of 0.33 to 0.30 kw-hr/kg.

Another control condition for the preparation of the DVA is the shear rate to which the DVA materials are subjected during extrusion. The shear rate for the extruder is calculated as:

$$\text{Shear rate, sec}^{-1} = (\pi \cdot \text{extruder diameter} \cdot \text{screw speed}) / \text{screw clearance}$$

Shear rate is typically independent of equipment size, permitting various size extruders to be used to obtain the DVA. For the present invention, the shear rate is in the range of 7500 $\sec^{-1}$ to 50 $\sec^{-1}$; or alternatively in the range of 5750 $\sec^{-1}$ to 65 $\sec^{-1}$ or in the range of 5000 $\sec^{-1}$ to 100 $\sec^{-1}$ or in the range of 4750 to 500 $\sec^{-1}$. When shear rate is multiplied by the residence time (equivalent to rate/free volume) of the material in the extruder, the shear strain per RPM of the machine can be determined and this value can be used for scale up independent of machine size when preparing materials. The residence time of the present invention is in the range of 60 seconds to 600 seconds, measured from the initial extruder feedthroat 14 to the discharge of the pellets from the pelletizer; when measured from the feedthroat 14 to the extruder end, the residence time is in the range of 30 seconds to 500 seconds.

The capacity or rate of the extruder 10 is proportional to the extruder size and screw speed for any given extruder screw design. For the present invention, the capacity of the extruder is preferably 30 kg/hr to a maximum 150 kg/hr for an extruder having a 40 to 200 RPM speed with a maximum diameter of up to 320 mm. In any embodiment of the present invention, the screw has a maximum diameter in the range of 40 mm to 150 mm or alternatively 40 mm to 100 mm. The capacity may be scaled up for larger diameter extruders using the following equation:

$$\text{Extruder 2 capacity} = [\text{extruder 1 capacity}] \cdot (\text{diameter extruder 2}/\text{diameter extruder 1})^{2.7}$$

This capacity is reduced from that conventionally used for thermoplastic vulcanizates. This is specific to this type of DVA wherein the morphology of the DVA is critical to achieving the desired performance in the intended end use of a tire innerliner.

Figure 1:
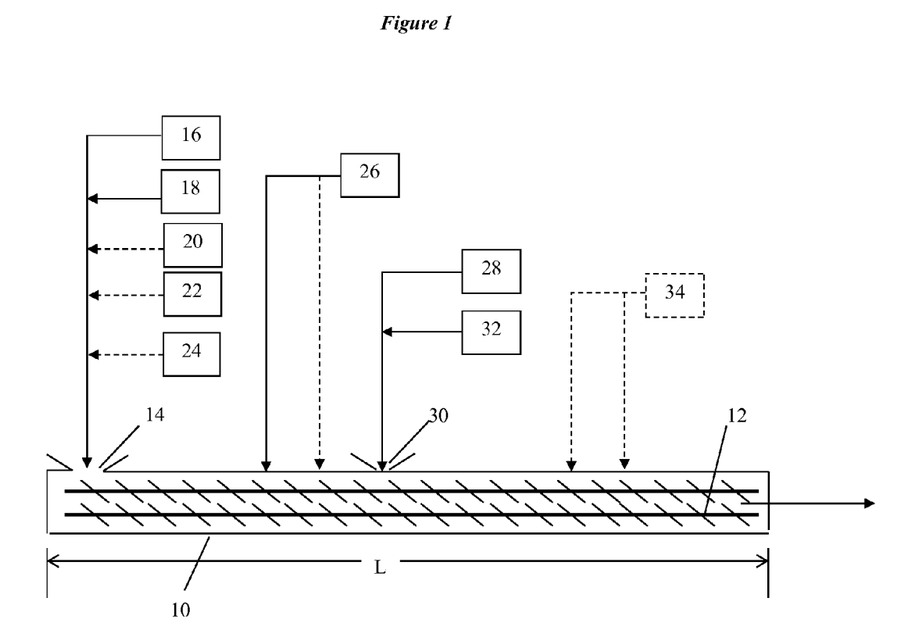
FIG. 1 is a schematic illustration of an extruder for manufacturing dynamically vulcanized alloys in accordance with the present invention.
Figure 2:
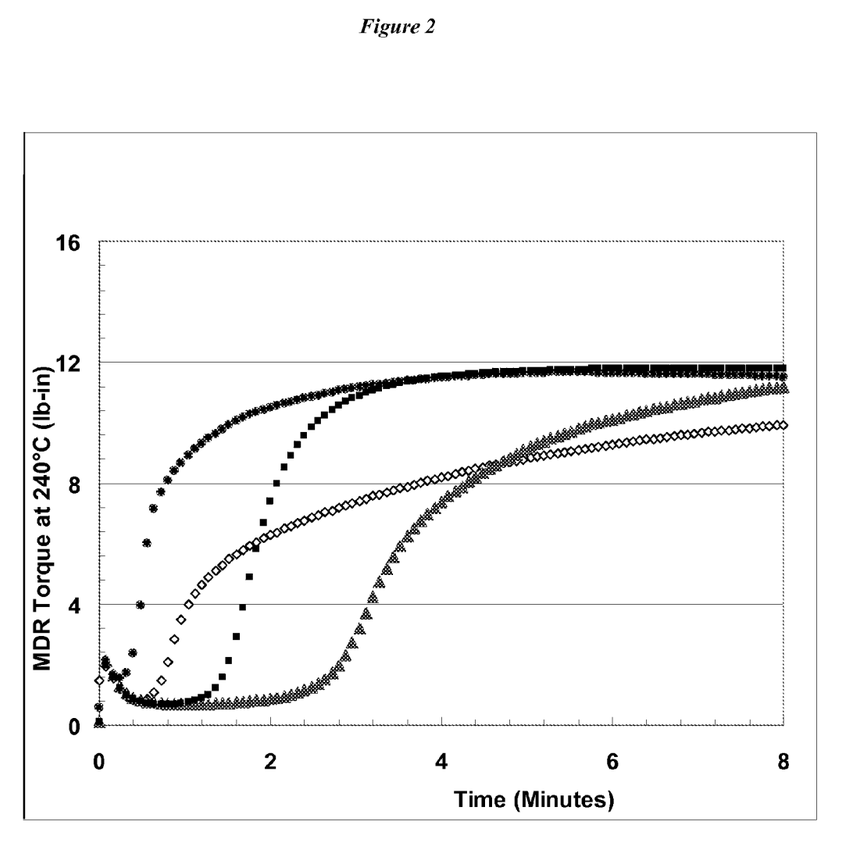
FIG. 2 is a graph of cure profiles of the rubber.

While FIG. 1 illustrates a twin screw extruder, the present invention may be practiced on an extruder that has more than two screws, and may also be practiced on a ring screw extruder of the type disclosed in U.S. Pat. No. 7,655,728 so long as the extruder has been set up or modified to achieve the above described addition sequence, specific energy, and shear rates.

During the dynamic vulcanization process, several key competing reactions/mechanisms occur. The first is the reaction between the thermoplastic resin and the elastomer. For example, a component of the thermoplastic, such as the amine group of polyamide, may react with the pendant halogen of a halogenated elastomer. This interfacial grafting reaction results in a high viscosity elastomer copolymer. Meanwhile, physical mechanisms may occur due to the shear mixing, such as an erosion phenomenon and other conventional drop breakup mechanism such as capillary drop break-up. The edge portions of rubber which are grafted with the thermoplastic resin are pulled away from the main rubber particle body during the shear mixing and elongation flowing of the copolymer. If the DVA is heated too much due to excessive energy or temperature applied to the system, cross-linking of the elastomer may actually slow down the erosion phenomenon and other conventional drop breakup mechanisms, and reduce the ability of the elastomer to be finely dispersed within the DVA.

The interfacial grafting reaction and the shear mixing allow for a DVA having a fine dispersion of elastomer as small particles in the continuous nylon phase. In the processing of the DVA, especially those blends containing a majority of elastomer, in the early stages of mixing, as the elastomer and the thermoplastic resin are melted together, the lower softening-temperature elastomer and the thermoplastic resin form a co-continuous morphology and may evidence thermoplastic resin particles. As the interfacial grafting reaction occurs the interfacial tension is lowered, allowing the two phases to become compatible. During curing, the elastomer phase is dispersed and it becomes a discontinuous phase dispersed in the continuous phase of thermoplastic resin. The dynamically vulcanized elastomer is preferably dispersed in the thermoplastic resin matrix in the form of small particles having an average particle size of not more than 1 micron, or in the alternative ranges of about 0.1 micron to about 1 micron, or about 0.1 micron to about 0.75 micron, or about 0.1 micron to about 0.5 micron.

Particle size can be determined by methods well known in the art and including tapping phase atomic force microscopy (AFM).

As already noted, the process by which the DVA is produced impacts the morphology of the DVA. The inventive process improves the morphology of the DVA over that which is achieved during prior conventional masterbatch mixing processes or prior twin-screw extruder operations. Due to the curative not being in the rubber as in the former masterbatch process the interfacial reaction is effectively decoupled from the curing reaction which in this inventive one-step process begins primarily at the point of curative addition and thereafter and therefore subsequent to the interfacial grafting reaction. The morphology of the DVA can be reflected by particular properties of the DVA film, including capillary viscosity and extrusion surface roughness, or determined by analytical tools such as atomic force microscopy.

The capillary viscosity of the DVA is measured on a Laboratory Capillary Rheometer; the measurement is referenced as LCR values. An increase in the capillary viscosity indicates a decrease in viscosity degradation that can occur during shear mixing, thus higher LCR values are desirable for the present invention. Preferably, the DVA has an average LCR viscosity at 240° C. of at least 350 Pa-sec when measured at 1200 sec$^{-1}$ and at least 900 Pa-sec when measured at 300 sec$^{-1}$. In any embodiment, the LCR viscosity, when measured at 300 sec$^{-1}$, is in the range of from about 900 Pa-sec to about 1600 Pa-sec, or in the range of from about 950 Pa-sec to about 1400 Pa-sec.

The extrusion surface roughness ("ESR") is a measure of the surface smoothness of the DVA, with lower numbers indicating a smoother surface. Lower numbers are also indicative of the elastomer phase being more uniformly and well-dispersed within the continuous thermoplastic resin phase. The ESR is a particularly important extrusion property as it may dictate the performance of the DVA in the final product in end-use applications. Preferably, the DVA has an ESR value not greater than 1.5 μmeters. In any embodiment, the ESR value is in the range of from about 0.5 to about 1.3 μmeters. In another embodiment, the ESR value of the DVA is in the range of about 0.5 to about 1.0 μmeters.

The invention, accordingly, provides the following embodiments:

A. A process for producing a dynamically vulcanized alloy, the alloy comprising at least one elastomer and at least one thermoplastic resin, the process comprising the following consecutive steps of:
  a. feeding the elastomer and a first portion of the thermoplastic resin into the initial feed throat of an extruder;
  b. mixing the elastomer and the first portion of thermoplastic resin;
  c. feeding compatibilizer into the extruder;
  d. mixing the elastomer, first portion of thermoplastic resin, and compatibilizer to begin grafting of the elastomer and the thermoplastic resin without any curing or any significant curing of the elastomer;
  e. feeding a second portion of the thermoplastic resin into the extruder; and
  f. mixing the contents of the extruder under shear conditions to being curing of the elastomer and mixing until the elastomer is dispersed as particles in a matric of the thermoplastic resin and the particles reach at least 80% cure, thereby forming a dynamically vulcanized alloy;

B. The process of embodiment A, wherein said elastomer is added directly into the feed throat without any prior mixing with other components of the dynamically vulcanized alloy;

C. The process of embodiment A or B, wherein at least one curative is added during step e);

D. The process of any one of or any combination of embodiments A to C, wherein after step e) and after initiation of curing of the elastomer particles, feeding into the extruder at least one compatibilizer or viscosity modifier;

E. The process of any one of or any combination of embodiments A to D, wherein during step a), c), or e) at least one stabilizer is also feed into to the extruder;

F. The process of any one of or any combination of embodiments A to E, further comprising the step of pelletizing the at least one curative with amounts of the thermoplastic resin prior to feeding the curative into the extruder;

G. The process of any one of or any combination of embodiments A to F, wherein the second portion of the thermoplastic resin is 10 to 75 wt % of the total thermoplastic resin of the alloy and the location of the addition of the second portion of thermoplastic resin is at any location in the range of 30 to 60% of the L/D ratio of the extruder;

H. The process of any one of or any combination of embodiments A to G, further comprising the step of feeding a secondary elastomer into the initial feed throat of the extruder;

I. The process of any one of or any combination of embodiments A to H, wherein the thermoplastic resin is selected from the group consisting of polyamides, polyimides, polycarbonates, polyesters, polysulfonates, polyactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, and mixtures thereof;

J. The process of any one of or any combination of embodiments A to I, wherein the thermoplastic resin is a polyamide and in particular is selected from the group consisting of nylon-6, nylon-12, nylon-6,6, nylon-6,9, nylon-6,10, nylon-6,12, nylon 6,66 copolymer, nylon-11, and mixtures thereof;

K. The process of any one of or any combination of embodiments H to J, wherein the secondary elastomer is maleic anhydride-modified ethylene ethyl acrylate;

L. The process of any one of or any combination of embodiments A to K, wherein the compatibilizer is a plasticizer (for example: BBSA), or a reactive plasticizer (for example: PIBSA), or a combination of plasticizer and reactive plasticizer;

M. The process of any one or any combination of embodiments A to K, wherein a portion of the total curative package is added at the initial feed throat;

N. The process of any one of or any combination of embodiments A to M, wherein the elastomer is an isobutylene derived elastomer;

O. The process of any one of or any combination of embodiments A to N, wherein the elastomer is a copolymer of an isobutylene and an alkylstyrene;

P. The process of any one of or any combination of embodiments A to O, wherein said elastomer is halogenated;

Q. The process of any one of or any combination of embodiments A to P, wherein the elastomer is present in the alloy in an amount in the range of from about 2 to about 90 wt % based on the total weight of elastomer and thermoplastic resin;

R. The process of any one of or any combination of embodiments A to Q, wherein the shear rate of mixing is in any one of the following ranges: 7500 sec$^{-1}$ to 50 sec$^{-1}$; 5750 sec$^{-1}$ to 65 sec$^{-1}$; 5000 sec$^{-1}$ to 100 sec$^{-1}$; or 4750 to 500 sec$^{-1}$;

S. The process of any one or any combination of embodiments A to R, wherein the residence time of the DVA in the extruder is in the range of 30 seconds to 500 seconds;

T. The process of any one or any combination of embodiments A to S, wherein the extruder has a capacity of 30 kg/hr to a maximum 150 kg/hr for an extruder having a 40 to 200 RPM speed with a maximum diameter of up to 320 mm;

U. The process of any one or any combination of embodiments A to T wherein, after the curatives have been fed into the extruder, the extruder is operated at a specific energy in the range of not more than 0.39 Kw-hr/kg, or in the range of 0.35 to 0.29 Kw-hr/kg, or in the range of 0.33 to 0.30 Kw-hr/kg;

V. The process of any one or any combination of embodiments A to U wherein the alloy is further extruded into a sheet or film;

W. The process of embodiment V wherein the formed DVA sheet or film has an ESR value in any one of the ranges of i) not greater than 1.5 μmeters, ii) 0.5 to 1.5 μmeters, iii) 0.5 to 1.3 μmeters, or iv) 0.5 to 1.0 μmeters.

EXAMPLES

The inventive process for manufacturing DVAs will now be further described with reference to the following non-limiting examples.

When possible, standard ASTM tests were used to determine the DVA's physical properties. Table 1 summarizes the testing procedures used in the Examples.

The ultimate elongation ("UE") of the DVA was measured in accordance with ASTM D412. The UE indicates the distance a strand of the material can be stretched before it breaks.

The M100 test measures the modulus of the material and indicates the resistance to strain at 100% extension in force per unit area.

The LCR is measured on a Laboratory Capillary Rheometer ("LCR"), according to a modified ASTM D-3835-02 test. The modification is the test is run at 220° C. or 240° C. with measurements taken at 1200 s$^{-1}$ or at 300 s$^{-1}$; the temperature and measurement speed employed are specified in the reported data. Any other modifications to the standard test conditions are reported with the appropriate data. In older comparative data, the material was tested at 1200 sec$^{-1}$ as this was conventional for material processed at higher shear rates. Part of the present invention is the knowledge that due to the change in feed order of the components into the extruder, the use of high shear is not required to achieve the desired physical properties of the DVA and that surprisingly, the present feed order enables the use of low shear forces and improved DVA morphology.

Extrusion surface roughness (ESR) is measured using a Surfanalyser, supplied by Federal, and measured in accordance with the manufacturer's instructions for operation. The Surfanalyser determines the arithmetic roughness, Ra, of the material surface.

Oxygen permeability was measured using a MOCON OxTran Model 2/61 operating under the principle of dynamic measurement of oxygen transport through a thin film. The units of measure are cc-mm/m$^2$-day-mmHg Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Permeability was tested by the following method. Thin, vulcanized test specimens from the sample compositions were mounted in diffusion cells and conditioned in an oil bath at 60° C. The time required for air to permeate through a given specimen is recorded to determine its air permeability. Test specimens were circular plates with 12.7-cm diameter and 0.38-mm thickness. The error (2σ) in measuring air permeability is ±0.245 (×10$^8$) units.

Low Temperature Fatigue (LTF) tests are conducted using a Constant Stress/Strain Fatigue Tester manufactured by Ueshima Seisakusho Co. Test specimens are cut from 1 mm thick extruded cast film using a JIS #3 die; material dried 16 hrs. at 150° C. A total of ten specimens are tested at one time @ −35° C., 5 Hz frequency, 40% total displacement. The machine records the number of cycles at which a specimen is broken. A characteristic cycle number (at 63% percentile) from Weibull distribution analysis is reported as the LTF value.

TABLE 1

Test Methods

| Parameter | Units | Test |
| --- | --- | --- |
| Ultimate tensile strength ("UTS") | MPa | ASTM D412 (ISO 37 type 2) |
| UE | % | ASTM D412 (ISO 37 type 2) |
| M100 | Mpa | ASTM D412 (ISO 37 type 2) |
| LCR | Pa · s | See text |
| ESR | μmeters | See text |
| Permeability Coefficient | cc-mm/ m$^2$-day-mmHg | See text |
| LTF | cycle numbers | See text |

A listing of various components used in the DVA samples is provided in Table 2.

TABLE 2

Various Components in the DVA

| Material | Brief Description | Commercial Source |
| --- | --- | --- |
| BIMSM 1 | 5 wt % PMS, 0.75 mol % BrPMS, Mooney viscosity of 45 ± 5 MU (1 + 8, 125° C.) | |
| BIMSM 2 | 7.5 wt % PMS, 1.2 mol % BrPMS, Mooney viscosity of 45 ± 5 MU (1 + 8, 125° C.) | |
| ZnO | Zinc Oxide | Kadox 911 Zinc Corp. |
| Stearic Acid | Stearic Fatty Acid | F1000; Harwick |
| ZnSt | Zinc Stearate | Witco Chemtura/ Crompton |
| Talc | | SG 2000; Nippon |
| Polyamide 1 | 85 wt % PA6/15 wt % PA66 | UBE 5033B; UBE Chemical |
| Polyamide 2 | 80 wt % PA6/20 wt % PA66 | UBE 5024; UBE Chemical |
| Polyamide 3 | 100 wt % PA6 | Ultramid B27; BASF |
| Polyamide 4 | PA6/PA66 | C3301; BASF |
| Polyamide 5 | 100 wt % PA6 | Ultramide B26; BASF |
| Plasticizer 1 | n-butylbenzene sulfonamide (BBSA) | Uniplex 214; Unitex Chemical Corp |
| Antioxidant 1 | | Irganox 1098; Ciba |

TABLE 2-continued

Various Components in the DVA

| Material | Brief Description | Commercial Source |
| --- | --- | --- |
| Antioxidant 2 | | Tinuvin 622LD; Ciba |
| Antioxidant 3 | Copper Iodide | Sigma-Aldrich |
| PIBSA | Polyisobutylene succinic anhydride, MW before anhydride reaction = 950, viscosity at 100° C. = 459 cSt, saponification # = 100 mg KOH/gm | PIBSA 950 from Texas Petrochemicals LP Or Dovermulse H1000 from Dover Chemical Corp. |
| Compatibilizer | maleic anhydride-modified ethylene ethyl acrylate (mEEA) | AR201; Mitsui-DuPont Chemicals Co., Ltd |

Comparative samples A1 and A2 were prepared by the following previously known process for preparing DVAs. A rubber master batch was first mixed using a batch internal mixer. The elastomeric masterbatch is also 'accelerated'—meaning the curative is preblended with the elastomer in the batch mixer at a temperature below cure initiation temperature of the rubber. After the rubber master batch was mixed it was introduced into a rubber granulator. A thermoplastic resin master batch was mixed using a twin screw extruder and then pelletized. Then the granulated rubber master batch, the compatibilizer, and the pelletized resin masterbatch were then fed into the DVA processing twin screw extruder having co-rotating fully intermeshing flights. This process is known as 'dual masterbatching'. DVA's prepared by the older masterbatching method may be subject to reversion/degradation of the elastomer if the elastomer masterbatch is prepared too far in advance of preparation of the DVA.

Comparative samples B1 and B2 were prepared by another known process wherein no elastomeric masterbatch was created. A resin master batch was prepared using the conventional process. The resin master batch, compatibilizer, elastomer, curatives, and all remaining ingredients were added directly to the feed throat of the DVA processing twin screw extruder.

The composition of Samples A1, A2, B1, and B2 were identical and is provided in Table 3, with the amount of each component expressed in terms of parts per hundred rubber. In these samples, in terms of wt % of the DVA, the BIMSM elastomer is present at 49.01 wt % and the primary thermoplastic resin, the polyamide copolymer, is present in an amount of 30.91 wt %, and the plasticizer is present in an amount of 13.25 wt %.

Properties for all of the comparative samples are set forth in Table 3.

TABLE 3

| | A1 | A2 | B1 | B2 |
| --- | --- | --- | --- | --- |
| BIMSM 1 | 100 | 100 | 100 | 100 |
| Stearic Acid | 0.6 | 0.6 | 0.6 | 0.6 |
| Zinc Sterate | 0.3 | 0.3 | 0.3 | 0.3 |
| Zinc oxide | 0.15 | 0.15 | 0.15 | 0.15 |
| Talc | 2.5 | 2.5 | 2.5 | 2.5 |
| Polyamide 1 | 63.07 | 63.07 | 63.07 | 63.07 |
| Polyamide 2 | — | — | — | — |
| Polyamide 3 | — | — | — | — |
| Plasticizer 1 | 27.04 | 27.04 | 27.04 | 27.04 |
| PIBSA | — | — | — | — |
| Compatibilizer | 10.05 | 10.05 | 10.05 | 10.05 |
| Antioxidant 1 | 0.22 | 0.22 | 0.22 | 0.22 |
| Antioxidant 2 | 0.09 | 0.09 | 0.09 | 0.09 |
| Antioxidant 3 | 0.02 | 0.02 | 0.02 | 0.02 |

TABLE 3-continued

|  | A1 | A2 | B1 | B2 |
|---|---|---|---|---|
| Total Feed Rate, kph | 150.0 | 150.1 | 150.3 | 150.1 |
| Extruder Speed (RPM) | 83.0 | 91.5 | 91.6 | 91.5 |
| UTS, MPa | 14.44 | 14.8 | 14.6 | 14.47 |
| UE, % | 366 | 400 | 401 | 408 |
| M100, Mpa | 6.15 | 5.82 | 5.42 | 5.52 |
| LCR, @ 1200 1/s, Pa · s | 291 | 267 | — | — |
| ESR, (μ meter) | 0.787 | 1.016 | 0.991 | 1.930 |

Samples in accordance with the disclosed invention were then prepared using the same twin screw extruder as above, wherein the location of the addition of the curative and a portion of the thermoplastic resin was varied. Data is provided in Table 4. For these samples, talc covered granulated elastomer, polyamide copolymer pellets, and the antioxidants in the form of a concentrate pellet were all individually added to the initial feedthroat 14 of the extruder 10. The PIBSA (as a compatibilizer) was added at a location approximately 15% of the extruder length, as measured from the initial feedthroat. Fifty percent of the polyamide and all of the curatives are introduced into the extruder 10 at varying points along the extruder L/D as identified in Table 4. Compositional values in Table 4 are all in phr.

TABLE 4

|  | 1 | 2 | 3 | 4 | 5 | 6 |
|---|---|---|---|---|---|---|
| BIMSM 1 | 100 | 100 | 100 | 100 | 100 | 100 |
| Stearic Acid | 0.6 | 0.6 | 0.6 | — | — | — |
| Zinc Sterate | 0.3 | 0.3 | 0.3 | — | — | — |
| ZnO | 0.15 | 0.15 | 0.15 | 2 | 2 | 2 |
| Talc | 2.5 | 2.5 | 2.5 | 2.5 | 2.5 | 2.5 |
| Polyamide 2 | 55.9 | 55.9 | 55.9 | 55.9 | 55.9 | 55.9 |
| Polyamide 3 | 14 | 14 | 14 | 14 | 14 | 14 |
| PIBSA | 10 | 10 | 10 | 10 | 10 | 10 |
| Antioxidant 1 | 0.22 | 0.22 | 0.22 | 0.22 | 0.22 | 0.22 |
| Antioxidant 2 | 0.09 | 0.09 | 0.09 | 0.09 | 0.09 | 0.09 |
| Antioxidant 3 | 0.02 | 0.02 | 0.02 | 0.02 | 0.02 | 0.02 |
| Total Polyamide | 69.9 | 69.9 | 69.9 | 69.9 | 69.9 | 69.9 |
| Total feed rate (KPH) | 30 | 30 | 30 | 30 | 30 | 30 |
| Downstream Input location for curatives and Polyamide, % L/D | 33 | 44 | 60 | 33 | 44 | 60 |
| UTS, Mpa | 10.86 | 13.12 | 11.85 | 12.39 | 15.92 | 13.56 |
| UE, % | 192 | 200 | 201 | 250 | 277 | 262 |
| M100, Mpa | 9.14 | 11.26 | 9.83 | 9.40 | 12.45 | 10.45 |
| LCR, @ 300 1/s, Pa · s | 969 | 1062 | 1071 | 1089 | 1320 | 1215 |
| Permeability Coefficient | 0.304 | 0.252 | 0.247 | 0.243 | 0.211 | 0.226 |
| ESR (μ meter) | 1.676 | 1.016 | 1.956 | 0.889 | 0.940 | 1.245 |

An appropriate comparison for the LCR values of Table 3 and Table 4 is that the higher frequency results (Table 3) will be approximately ¼ the results measured at the lower frequency (Table 4). Thus, it can be seen that with Samples 1 to 3, using a multi-component curative system, the LCR are comparable to the LCR values for the conventionally prepared DVA and therefore the viscosities of the material during extrusion for the prior art methods and those of the present invention are comparable.

However, ultimate tensile strength values and ultimate elongation values are lower, but the 100% modulus values are higher. This indicates a high degree of cure, and achieves a goal of improved morphology and performance for the DVA. For Samples 4 to 6, using only a metal oxide as curative, the LCR values are further improved over the samples in Table 3, while also achieving a high 100% modulus with comparable UTS and lower ultimate elongation.

The physical properties for each set of DVAs, as defined by the cure system, show lower permeability coefficients and lower ESR values were obtained at L/D=44%. Thus, a downstream input of L/D=44% is a preferred embodiment for all or at least one embodiment of the present invention. The above data also shows the DVA samples with the metal oxide curative obtain lower permeability coefficients and lower ESR values.

An advantage of using the inventive one-pass process versus conventional separate masterbatching of the rubber and thermoplastic resins is elimination of potential degradation of the masterbatch while the material waits to be mixed as a DVA. The longer an accelerated rubber masterbatch sits, the rubber becomes more susceptible to scorch. The longer the thermoplastic resin masterbatch sits, the plasticizers may begin to exude from the mixture which may lead to difficulties in handling and metering of the product into a mixer due to an increase in the tackiness of the resin pellets.

To determine the effects of splitting the amounts of thermoplastic resin fed into the initial feedthroat versus a downstream location, the amount of resin injected at a downstream location of 44% L/D was varied and the resulting DVA was testing. The DVA composition is provided in Table 5 and the results are set forth in Table 6 below. The addition process included the step of adding the compatibilizer at a location downstream of the initial feedthroat at a distance of approximately 15% L/D.

The effect of varying the extruder barrel temperature after the addition of curatives and the varying additional nylon amounts was also studied. The temperature noted in Table 6 is the material temperature as cure is initiated and as it proceeds during the extruder until a point approximately 80% to 85% L; thereafter, the temperature begins to decrease until the DVA exits the extruder. Data relevant to the temperature change is also set forth in FIG. 3.

TABLE 5

| 7 | phr |
|---|---|
| BIMSM 2 | 100 |
| ZnO | 2.0 |
| Talc | 2.5 |
| Polyamide 4 | 60 |
| Polyamide 5 | 15 |
| PIBSA | 10 |
| Antioxidant 1 | 0.22 |
| Antioxidant 2 | 0.09 |
| Antioxidant 3 | 0.02 |
| Total Polyamide | 75 |

TABLE 6

| Run | Percent Downstream Nylon, % | Feed Rate, kg/hr | Screw RPM | Barrel Temp, ° C. | Specific Energy, kw-hr/kg | ESR, μ meter | LCR @ 240° C. and 1200 1/s, Pa · s |
|---|---|---|---|---|---|---|---|
| 1 | 10.00 | 33.43 | 50.15 | 240 | 0.362 | 0.787 | 974 |
| 2 | 25.00 | 35.79 | 53.69 | 240 | 0.366 | 1.270 | 1067 |

TABLE 6-continued

| Run | Percent Downstream Nylon, % | Feed Rate, kg/hr | Screw RPM | Barrel Temp, °C | Specific Energy, kw-hr/kg | ESR, μ meter | LCR @ 240° C. and 1200 1/s, Pa · s |
|---|---|---|---|---|---|---|---|
| 3 | 40.00 | 38.51 | 57.77 | 240 | 0.366 | 0.762 | 1030 |
| 4 | 50.00 | 40.57 | 60.85 | 240 | 0.319 | 1.473 | 1063 |
| 5 | 70.40 | 45.53 | 68.29 | 240 | 0.308 | 1.143 | 1002 |
| 6 | 10.00 | 33.43 | 50.15 | 260 | 0.330 | 1.27 | 1026 |
| 7 | 25.00 | 35.79 | 53.69 | 260 | 0.330 | 1.092 | 1080 |
| 8 | 40.00 | 38.51 | 57.77 | 260 | 0.310 | 1.219 | 997 |
| 9 | 50.00 | 40.57 | 60.85 | 260 | 0.319 | 1.295 | 1111 |
| 10 | 70.40 | 45.53 | 68.29 | 260 | 0.295 | 0.914 | 1012 |

All of the ESR values of the DVA using varying amounts of 10 to 70% downstream addition of the nylon are less than 1.5 μmeters and almost all the LCR values are greater than 1000. Thus, showing that downstream addition of the nylon does not hinder the dispersity of the elastomer into the thermoplastic resin. The specific energy is lower for each barrel temperature case when the percentage of downstream nylon is increased. The lower specific energy can allow a proportional increase in extrusion feed rate in cases wherein the machine power is rate limiting. This often is the case in current DVA process due to lower screw speed operation than conventional olefinic DVA process.

Figure 3:
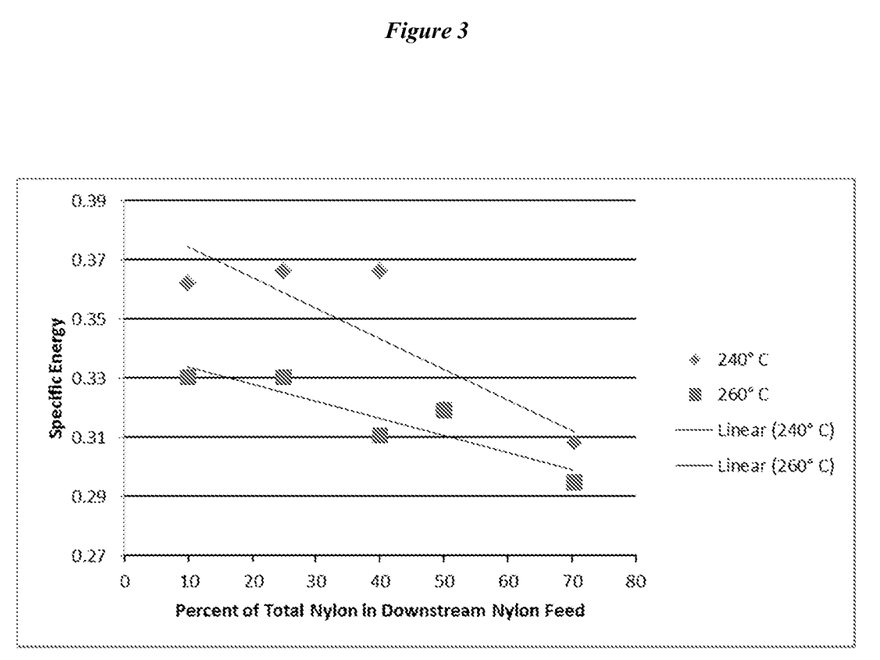
FIG. 3 is a chart of specific energy versus percentage of downstream nylon addition for the data of Table 6.

Data regarding the specific energy for both barrel temperatures relative to the amount of downstream nylon introduced into the extruder has been charted in FIG. 3 and a linear extrapolation of the data has been determined. As seen in FIG. 3, with an increase in the temperature during curing, the specific energy expended by the system is decreased.

This reduction in thermoplastic resin amounts at the initial feed throat permits longer residence time in the extruder; the longer residence time enables the rubber to nylon compatibilization to achieve a higher graft for smaller particle size of rubber prior to the beginning of any curing. Any increase in temperature is limited due to lower specific energy to prevent scorching of the elastomer as the DVA travels through the extruder.

A study was also completed with the DVA composition of comparative sample A1 wherein the addition point of the curative package alone was varied along the length of the extruder.

TABLE 7

| % L | LTF, kilocycles |
|---|---|
| 0 | 125 |
| 10 | 190 |
| 33 | 305 |
| 44 | 360 |
| 60 | 220 |

The above performance characteristics of the DVA are improved even when only the curative package is added downstream of the initial feedthroat.

A further comparison of the mixing method was made on a single formulation. The DVA was prepared by both the previous masterbatching method (method A described above) and the current disclosed process. The DVA composition is set forth below in Table 8.

TABLE 8

| BIMSM 1 | 100 |
|---|---|
| Stearic Acid | 0.6 |
| Zinc Sterate | 0.3 |
| Zinc oxide | 0.15 |
| Talc | 2.5 |
| Polyamide 1 | 56.66 |
| Polyamide 3 | 6.3 |
| Plasticizer 1 | 26.99 |
| Compatibilizer | 10.05 |
| Antioxidant 1 | 0.32 |
| Antioxidant 2 | 0.13 |
| Antioxidant 3 | 0.03 |

Multiple runs were made of the same composition but using the two different methods. The results of the multiple runs are set forth in Table 9.

TABLE 9

| Run | Method | % L/D for Downstream Nylon | % Downstream Nylon | Permeability | Shore A Hardness | ESR, μ meter | LCR, @ 240° C. and 1200 1/s Pa · s |
|---|---|---|---|---|---|---|---|
| 11 | Masterbatch | — | — | 0.172 | 85.3 | 1.179 | 881 |
| 12 | Masterbatch | — | — | 0.168 | 85.3 | 0.894 | 860 |
| 13 | Masterbatch | — | — | 0.187 | 85.7 | 0.909 | 884 |
| 14 | FIG. 1 | 44 | 65 | 0.125 | 86.2 | 0.848 | 812 |
| 15 | FIG. 1 | 44 | 65 | 0.114 | 86.3 | 0.678 | 805 |
| 16 | FIG. 1 | 44 | 65 | 0.133 | 86.5 | 0.551 | 876 |

As evidenced by the data, the Shore A hardness values for the two methods are comparable, however, the permeability is significantly improved, as is the ESR value. Additionally, the LCR values are equal or lower, which can help in capacity increases where torque or melt temperature is the rate limit. Using the disclosed method of preparing the DVA, it is possible to obtain films having a permeability coefficient of not more than 0.16 cc-mm/m$^2$-day-mmHg, or alternatively not more than 0.13 cc-mm/m$^2$-day-mmHg, or in the range of 0.15 to 0.05 cc-mm/m$^2$-day-mmHg; the lower values can be obtained by adjusting the formulation to elastomers and thermoplastic resins have independent lower permeability coefficients and using the disclosed method of DVA preparation.

While the above specification and examples are specific to low permeability elastomers as the principal/primary elastomer, as the described process is directed to a solution for creating DVAs of a reactive mixture wherein interfacial grafting occurs, the process may be used with other types of elastomers and thermoplastics (and secondary materials) wherein the mixture is a reactive mixture (exclusive of any cross-linking reaction due to added curatives).

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process for producing a dynamically vulcanized alloy, the alloy comprising at least one elastomer and at least one thermoplastic resin, the process comprising the following consecutive steps of:
 (a) feeding the elastomer and a first portion of the thermoplastic resin into the initial feed throat of an extruder;
 (b) mixing the elastomer and the first portion of thermoplastic resin;
 (c) feeding compatibilizer into the extruder;
 (d) mixing the elastomer, first portion of thermoplastic resin, and compatibilizer to begin interfacial grafting of the elastomer and the thermoplastic resin without any significant curing of the elastomer;
 (e) feeding a second portion of the thermoplastic resin into the extruder; and
 (f) subsequent to the interfacial grafting, mixing the contents of the extruder under shear conditions to mix and cure the elastomer until the elastomer is dispersed as discrete particles in a matrix of the thermoplastic resin and the elastomer particle achieve at least 80% cure forming a dynamically vulcanized alloy.

2. The process as claimed in claim 1, wherein said elastomer is added directly into the feed throat without any prior mixing with other components of the dynamically vulcanized alloy.

3. The process as claimed in claim 2, wherein after the curatives have been fed into the extruder in step e), the extruder is operated at a specific energy in the range of not more than 0.39 Kw-hr/kg.

4. The process as claimed in claim 1, wherein at least one curative is fed into the extruder with the second portion of the thermoplastic resin.

5. The process as claimed in claim 4, further comprising the step of pelletizing the at least one curative with portions of the thermoplastic resin prior to feeding the curative into the extruder, wherein the amount of the curative added is about 2 to about 3 phr based on the alloy.

6. The process as claimed in claim 1, wherein after step e) and after initiation of cure of the elastomer particles, additional compatibilizer or at least one viscosity modifier is fed into the extruder.

7. The process as claimed in claim 1, wherein during step a), c), or e) at least one stabilizer is also fed into to the extruder.

8. The process as claimed in claim 1, wherein the second portion of thermoplastic resin added in step e) is 10 to 75 wt % of the total thermoplastic resin in the alloy.

9. The process as claimed in claim 1, wherein the second portion of thermoplastic resin is fed into the extruder at a location of 30% to 60% of an L/D ratio of the extruder wherein L is the screw length of the extruder and D is the maximum bore width of the extruder barrel.

10. The process as claimed in claim 1, wherein the thermoplastic resin is selected from the group consisting of polyamides, polyimides, polycarbonates, polyesters, polysulfonates, polyactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, and mixtures thereof.

11. The process as claimed in claim 1, wherein the thermoplastic resin is a polyamide selected from the group consisting of nylon-6, nylon-12, nylon-6,6, nylon-6,9, nylon-6,10, nylon-6,12, nylon 6,66 copolymer, nylon-11, and mixtures thereof.

12. The process as claimed in claim 1, wherein the elastomer is an isobutylene derived elastomer.

13. The process as claimed in claim 1, wherein the elastomer is a copolymer of an isobutylene and an alkystyrene.

14. The process as claimed in claim 1, wherein the elastomer is present in the alloy in an amount in the range of from about 2 to about 90 wt % based on the total alloy blend weight or the thermoplastic resin is present in the alloy in an amount in the range of from 10 to 98 wt % based on the total alloy blend weight.

15. The process as claimed in claim 1, wherein the thermoplastic resin is present in the alloy in an amount of 40 to 80 phr.

16. A film formed from a dynamically vulcanized alloy manufactured by the process in accordance with claim 1.

17. The film as claimed in claim 16, wherein the film has an extrusion surface roughness (ESR) value in the range of 0.5 to 1.5 meters.

18. The film as claimed in claim 16, wherein the film has a permeability coefficient of not more than 0.16 cc-mm/m$^2$-day-mmHg.

19. The process as claimed in claim 1, wherein the extruder temperature is reduced by 5° to 50° C. after the second portion of the thermoplastic resin is fed into the extruder.

* * * * *